(12) United States Patent
Weaver et al.

(10) Patent No.: US 8,437,794 B2
(45) Date of Patent: May 7, 2013

(54) METHODS OF DETERMINING UPLINK TARGET SIGNAL-TO-INTERFENCE-AND-NOISE RATIOS AND SYSTEMS THEREOF

(75) Inventors: Carl F. Weaver, Morris Plains, NJ (US); Yang Yang, Morris Plains, NJ (US); Anil M. Rao, Wheaton, IL (US)

(73) Assignee: Alcatel Lucent, Paris (FR)

( * ) Notice: Subject to any disclaimer, the term of this patent is extended or adjusted under 35 U.S.C. 154(b) by 258 days.

(21) Appl. No.: 12/656,389

(22) Filed: Jan. 28, 2010

(65) Prior Publication Data

US 2011/0183702 A1     Jul. 28, 2011

(51) Int. Cl.
*H04B 7/00*     (2006.01)

(52) U.S. Cl.
USPC ........ 455/522; 455/69; 455/67.11; 455/226.3

(58) Field of Classification Search .................. 455/522, 455/69, 67.11, 226.3; 370/252, 329
See application file for complete search history.

(56) References Cited

U.S. PATENT DOCUMENTS

| | | | | |
|---|---|---|---|---|
| 2006/0233222 A1* | 10/2006 | Reial et al. | ...... | 375/147 |
| 2007/0155338 A1* | 7/2007 | Hong et al. | ...... | 455/69 |
| 2007/0178930 A1* | 8/2007 | Xiao et al. | ...... | 455/522 |
| 2007/0280183 A1* | 12/2007 | Cho et al. | ...... | 370/338 |
| 2008/0166976 A1* | 7/2008 | Rao | ...... | 455/69 |
| 2008/0220806 A1* | 9/2008 | Shin et al. | ...... | 455/522 |
| 2011/0194423 A1* | 8/2011 | Cho et al. | ...... | 370/252 |

FOREIGN PATENT DOCUMENTS

EP     1 811 683     7/2007
WO     WO 2008/115660     9/2008

OTHER PUBLICATIONS

"A Simple Robust Algorithm for Self Organizing Dynamic FFR on the Uplink", Alexander L. Stolyar et al., Feb. 2009.
"3GPP TS 36.213 V8.5.0, 3$^{rd}$ Generation Partnership Project; Technical Specification Group Radio Access Network; Evolved Universal Terrestrial Radio Access (E-UTRA); Physical layer procedures", Release 8, Dec. 2008.
International Search Report and Written Opinion dated Apr. 5, 2011.

\* cited by examiner

*Primary Examiner* — April G Gonzales
(74) *Attorney, Agent, or Firm* — Harness, Dickey & Pierce, P.L.C.

(57) ABSTRACT

Example embodiments are directed to a method of determining an uplink target signal-to-interference-and-noise ratio (SINR). In one embodiment, the method includes determining the uplink target SINR for a user equipment (UE) based on a downlink signal-to-interference ratio (SIR). The downlink SIR is determined based on a channel quality indication (CQI) index received from the user equipment.

18 Claims, 5 Drawing Sheets

METHODS OF DETERMINING UPLINK TARGET SIGNAL-TO-INTERFENCE-AND-NOISE RATIOS AND SYSTEMS THEREOF

BACKGROUND

A cellular communications network typically includes a variety of communication nodes coupled by wireless or wired connections and accessed through different types of communications channels. Each of the communication nodes includes a protocol stack that processes the data transmitted and received over the communications channels. Depending on the type of communications system, the operation and configuration of the various communication nodes can differ and are often referred to by different names. Such communications systems include, for example, a Code Division Multiple Access 2000 (CDMA2000) system and Universal Mobile Telecommunications System (UMTS).

UMTS is a wireless data communication and telephony standard which describes a set of protocol standards. UMTS sets forth the protocol standards for the transmission of voice and data between a base station (BS) or Node B (cell site) and a mobile or User Equipment (UE). UMTS systems typically include multiple radio network controllers (RNCs). The RNC in UMTS networks provides functions equivalent to the Base Station Controller (BSC) functions in GSM/GPRS networks. However, RNCs may have further capabilities including, for example, autonomously managing handovers without involving mobile switching centers (MSCs) and Serving General Packet Radio Service (GPRS) Support Nodes (SGSNs). The cell site is responsible for air interface processing and some Radio Resource Management functions. The cell site in UMTS networks provides functions equivalent to the Base Transceiver Station (BTS) in GSM/GPRS networks. Cell sites are typically physically co-located with existing GSM base transceiver station (BTS) to reduce the cost of UMTS implementation and minimize planning consent restrictions.

Figure 1:
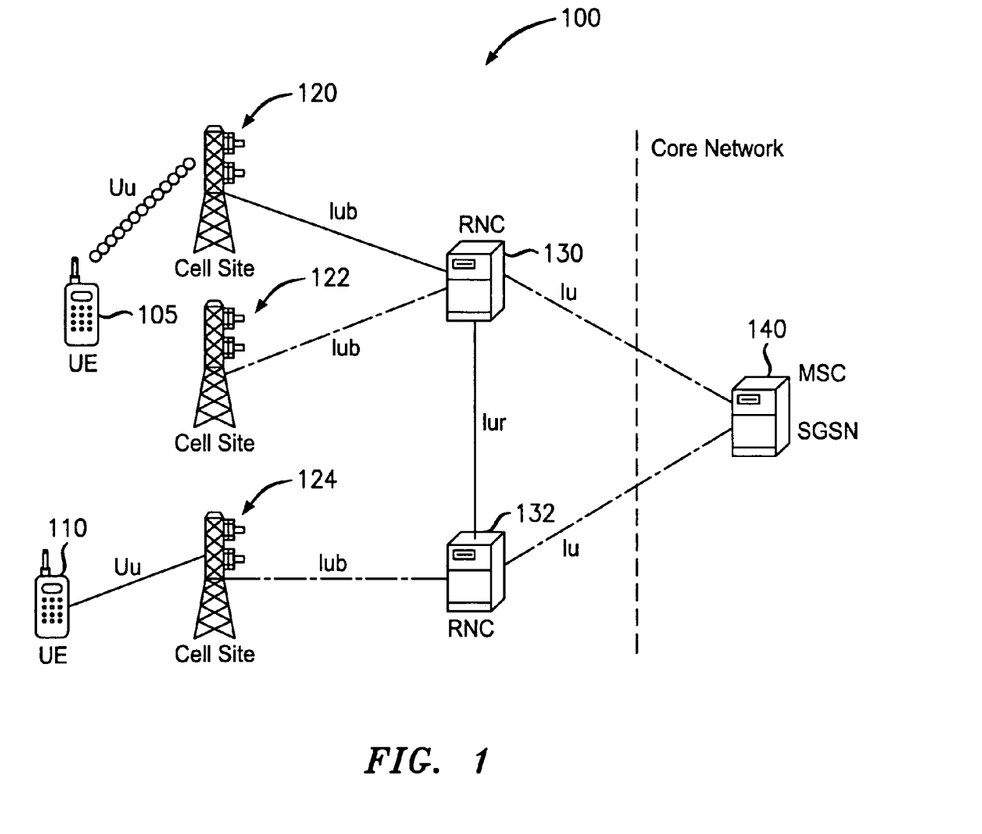
FIG. 1 illustrates a conventional communication system operating in accordance with UMTS protocols.

FIG. 1 illustrates a conventional communication system 100 operating in accordance with UMTS protocols. Referring to FIG. 1, the communication system 100 may include a number of cell sites such as cell sites 120, 122 and 124, each serving the communication needs of UEs such as UEs 105 and 110 in their respective coverage area. A cell site may serve a coverage area called a cell, and the cell may be divided into a number of sectors. For ease of explanation, the terminology cell may refer to either the entire coverage area served by a cell site or a single sector of a cell site. Communication from a cell site to a UE is referred to as the forward link or downlink. Communication from a UE to a cell site is referred to as the reverse link or uplink.

The cell sites 120, 122 and 124 are connected to an RNC such as RNCs 130 and 132, and the RNCs are connected to a MSC/SGSN 140. The RNC handles certain call and data handling functions, such as, as discussed above, autonomously managing handovers without involving MSCs and SGSNs. The MSC/SGSN 140 handles routing calls and/or data to other elements (e.g., RNCs 130/132 and cell sites 120/122/124) in the network or to an external network. Further illustrated in FIG. 1 are conventional interfaces Uu, Iub, Iur and Iu between these elements.

A fractional power control (FPC) scheme has been proposed for controlling the mobile or UE transmission power on the uplink of the 3GPP LTE standard. This open loop fraction power control technique proposes setting the UE transmit power spectral density such that a fraction of the path loss (including shadowing) may be compensated. When ignoring a maximum UE transmit power spectral density (power per tone), the UE transmit power spectral density (PSD) P may be established as:

$$P = -\alpha G + P_o \quad (1)$$

where P is the UE PSD, $\alpha$ is an FPC alpha, G is a long term average path gain (in dB) and is common to the uplink and downlink and $P_o$, is a PSD reference quantity that is sent to the UE via downlink signaling.

Using FPC, $$P_o = I + \Gamma_1 - (1-\alpha)G_0 \quad (2)$$

where I is a long term average received noise plus interference density (in dBm) per physical resource block (PRB) bandwidth, $\Gamma_1$ is the target SINR (in dB) when $\alpha$ equals one and $G_0$, is a calibration gain in dB.

Using questions (1) and (2), the implied target SINR is:

$$\Gamma = \Gamma_1 + (1-\alpha)(G - G_0) \quad (3)$$

However, in certain situations, there is no compensation for the path loss and all UEs transmit with the same transmit power spectral density (possible maximum power), which results in high interference levels and poor cell edge rate performance. In other situations, FPC results in traditional slow power control in which the path loss is fully compensated and all UEs are received with the same SINR. This results in poor spectral efficiency, but with good edge rate.

To improve on FPC, relative path gain (RPG) was developed. In RPG, an uplink transmission power is controlled based on a difference of a path loss between the UE and the serving cell site and a path loss between the UE and a next best neighboring cell site. However, RPG takes up a substantial amount of air interface overhead and requires more processing for the UE. Consequently, RPG is not always achievable. More specifically, the UE may only report once or periodically when a ratio of a path loss between the UE and the serving cell site and a path loss between the UE and a next best neighboring cell site exceeds a threshold and may not report at all if the ratio is below the threshold. Thus, there may be a lot of implementation error and air interface overhead when using RPG.

Moreover, the known power control schemes fail to take into account a sum of the actual interfering effects to all of the other neighboring cell sites and require additional overhead.

SUMMARY

At least one embodiment makes use of the level of interference a UE will generate to its neighbor cell/sector in determining the transmit power spectral density for the UE. Accordingly, advantages include allowing for smaller variance in the interference distribution, higher throughput, and/ or etc. Moreover, example embodiments improve cell edge data rate using a downlink SIR to estimate an uplink target SINR.

At least one example embodiment provides a method of determining an uplink target signal-to-interference-and-noise ratio (SINR). The method includes first determining the uplink target SINR for a user equipment (UE) based on a downlink signal-to-interference ratio (SIR). The downlink SIR is determined based on a channel quality indication (CQI) index received from the user equipment.

At least another example embodiment provides a system including a cell site configured to determine an uplink target signal-to-interference-and-noise ratio (SINR) for a user equipment (UE) based on a downlink signal-to-interference ratio (SIR), the downlink SIR being determined based on a channel quality indication (CQI) index received from the user equipment.

BRIEF DESCRIPTION OF THE DRAWINGS

Example embodiments will be more clearly understood from the following detailed description taken in conjunction with the accompanying drawings. FIGS. 1-4 represent non-limiting, example embodiments as described herein.

DETAILED DESCRIPTION

Various example embodiments will now be described more fully with reference to the accompanying drawings in which some example embodiments are illustrated. In the drawings, the thicknesses of layers and regions may be exaggerated for clarity.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes (e.g., a scheduler located at a cell site, base station or Node B). Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. The tangible storage medium may be magnetic (e.g., a floppy disk or a hard drive)

or optical (e.g., a compact disk read only memory, or "CD ROM"), and may be read only or random access. Similarly, the transmission medium may be twisted wire pairs, coaxial cable, optical fiber, or some other suitable transmission medium known to the art. Example embodiments are not limited by these aspects of any given implementation.

As used herein, the term "user equipment" (UE) may be synonymous to a mobile user, mobile station, mobile terminal, user, subscriber, wireless terminal and/or remote station and may describe a remote user of wireless resources in a wireless communication network. The term "cell site" may be understood as a one or more cell sites, base stations, access points, and/or any terminus of radio frequency communication. Although current network architectures may consider a distinction between mobile/user devices and access points/cell sites, the example embodiments described hereafter may generally be applicable to architectures where that distinction is not so clear, such as ad hoc and/or mesh network architectures, for example. Serving cell site may refer to the cell site currently handling the needs of the UE.

Figure 2:
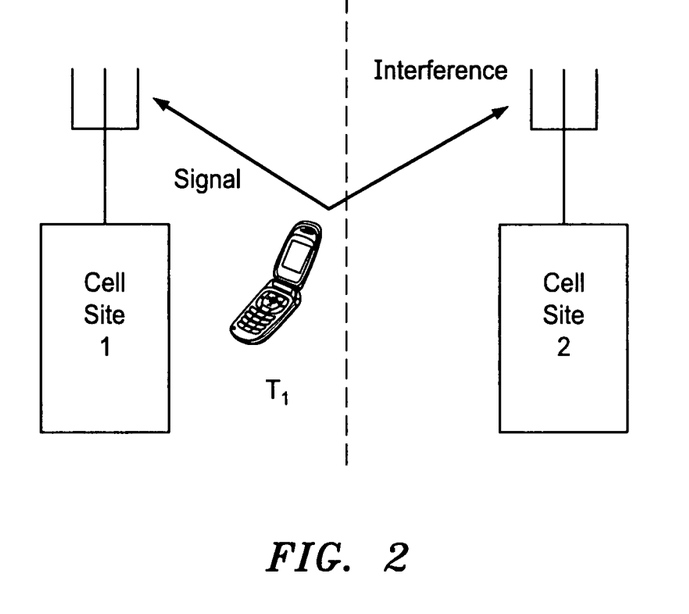
FIG. 2 illustrates an example where a UE may cause interference in a neighboring cell.

Example embodiments will be described with respect to the UMTS system illustrated in FIG. 1. However, it will be understood that example embodiments are not limited to this system or to UMTS systems. For example, example embodiments may be implemented in CDMA, WiMax and other network structures As discussed above, one problem with open loop FPC is that it does not directly take into consideration the amount of interference a UE will generate to a neighbor cell/sector. For example, FIG. 2 illustrates an example where a UE may cause interference in a neighboring cell/sector (hereinafter collectively referred to as a cell). In FIG. 2, UE T1 is served by cell site 1 and generates interference to cell site 2. However, if UE T1 has a strong shadow fade to cell site 2, then the UE 1 should be allowed to transmit at a higher transmit power spectral density as compared to the case when UE T1 has a small shadow fade to cell site 2. Another example is the case of a non-homogeneous deployment in which cell site 2 has a much larger cell radius, in which case UE T1 should be allowed to transmit at higher power levels.

According to at least one example embodiment, the uplink target SINR may be determined based on a downlink signal-to-interference ratio (SIR). Using the downlink SIR to determine the uplink target SINR allows for smaller variance in the interference distribution and/or higher throughput. Moreover, cell edge data rate is improved using the downlink SIR to determine an uplink target SINR.

In accordance with at least one example embodiment, the downlink SIR is used to determine an uplink target SINR. The downlink SIR encompasses a sum of interfering effects to all neighboring cell sites. Consequently, a serving cell site is not required to ask a UE to transmit power information regarding neighboring cell sites and a UE is not required to process neighboring cell site power information to report to the serving cell site.

More specifically, an uplink rise contribution (interference effect) of a UE m on a neighboring cell site may be determined as follows:

$$R_{i,m} = \frac{g_{i,m}\gamma_m}{g_{s,m}} \quad (4)$$

where $g_{i,m}$ is a path gain from the UE m to a neighboring cell site i, $g_{s,m}$ is a path gain from the UE m to a serving cell site s and $\gamma_m$ is an uplink target SINR of the UE m. The UE m determines the power to transmit based on the downlink pass loss and the uplink target SINR received from the cell site.

Therefore, the uplink rise contribution of the UE on all neighboring cells may be determined as follows:

$$R_m = \frac{\gamma_m \sum_{i \neq s} g_{i,m}}{g_{s,m}} = \frac{\gamma_m \left(\sum_i g_{i,m} - g_{s,m}\right)}{g_{s,m}} \quad (5)$$

The rise contribution may be limited by a constant R. The constant R can be chosen based on at least one of edge rate, cell or sector throughput, a target interference level, interference-to-noise (IoT) ratio and any other uplink communication parameter. The constant R may be determined by an operator of the system, through empirical testing, deployment conditions and/or through SON (Self Optimizing Network) capability. Consequently, the uplink target SINR $\gamma_m$ may be determined as follows:

$$\gamma_m = R\frac{g_{s,m}}{\sum_i g_{i,m} - g_{s,m}} = R\varphi_I \quad (6)$$

where $\phi_I$ is the downlink SIR for the UE m, assuming a time-division duplex (TDD) operation. Therefore, the uplink target SINR may be determined based on the downlink SIR. It should be understood that example embodiments should not be limited to TDD. For example, example embodiments and more specifically, equation (6), may be implemented in frequency-division duplex (FDD) by averaging out fast fading.

Moreover, in terrestrial cellular operations the downlink SINR generally is a good approximation for the downlink SINR. More specifically, the difference between an actual downlink SIR (determined by the UE) and the approximated downlink SINR (determined by the serving cell site) based on the downlink SIR is small (on order of 1 dB or less). Therefore, either the downlink SIR or the approximated downlink SINR may be used for estimating uplink target SINR. Consequently, the approximated downlink SINR may be referred to as the downlink SINR or downlink SIR and is referred to as the downlink SINR throughout this description.

In logarithmic terms, equation (6) may be converted to:

$$\Gamma = R + \Gamma_D \quad (7)$$

where $\Gamma$ is the uplink target SINR (in dB), $\Gamma_D$ is the downlink SIR (in dB) and R is the same as above, except in dB. R is proportional to the total interference introduced by a UE in the uplink.

Equations (6) and (7) may be referred to as a full downlink SIR case to distinguish the full downlink SIR from fractional downlink SIR. Full downlink SIR may have a greater sector throughput but at a cost of edge rate.

In at least another example embodiment, an uplink target SINR may be determined based on a downlink SIR using fractional downlink SIR.

As described above, a UE transmit spectral density P, when ignoring the maximum UE transmit power spectral density, is given by equation (1). For a fractional downlink SIR based case, the FPC alpha α may be set to one at the UE. Therefore, the UE PSD P may be determined as follows:

$$P = -G + P_o \quad (8)$$

and $$P_0 = I + \Gamma \quad (9)$$

where the target uplink SINR becomes, $$\Gamma = \Gamma_1 + (1-\beta)(\Gamma_D + \Gamma_O) \quad (10)$$

where $\Gamma_D$ is the downlink SINR, $\Gamma_O$ is constant for calibration and $\Gamma_1$ is the target SINR for $\beta=1$. $\beta$ is a constant that when set to O reverts to the full downlink SIR case and when set to 1 reverts to a constant SINR case.

By shifting $\Gamma_o$, the system may change a pivot point relative to a distribution of the downlink SIR. $\Gamma_o$, $\Gamma_1$ and $\beta$ may be optimized to increase performance of the system. $\Gamma_o$, $F_1$ and $\beta$ may be chosen based on at least one of uplink edge rate, sector throughput and a combination of the two.

The fractional downlink SIR case may be transformed into the full downlink SIR by setting $\beta$ to zero and $R=\Gamma_0+\Gamma_1$, where R is proportional to the total interference introduced by the UE across all cell sites.

The full downlink SIR may favor sector throughput (STP) as opposed to an UE edge rate transmission. The fractional downlink SIR improves the UE edge rate transmission by changing the value of $\beta$.

A serving cell site may determine the downlink SIR from a downlink channel quality indication (CQI) index. As will be understood from the description below, using the downlink SIR as a metric for determining an uplink target SINR does not require that the UE perform additional processing to report interference effects from neighboring cell sites because the downlink SIR represents a sum of the interference effects and can be determined from the downlink CQI index. Determining a CQI index using at least the downlink SINR is known by those familiar with a LTE compatible UE or base station equipment. There may be minor variations (order of 1 dB or less) that a UE implementer may vary for tradeoffs of cost versus performance. "Evolved Universal Terrestrial Radio Access (E-UTRA); Physical layer procedures," $3^{rd}$ *Generation Partnership Program, 3GPP TS 36.212, V8.5.0*, December, 2008, the entire contents of which are incorporated herein by reference, outlines determining the CQI index.

Figure 3A:
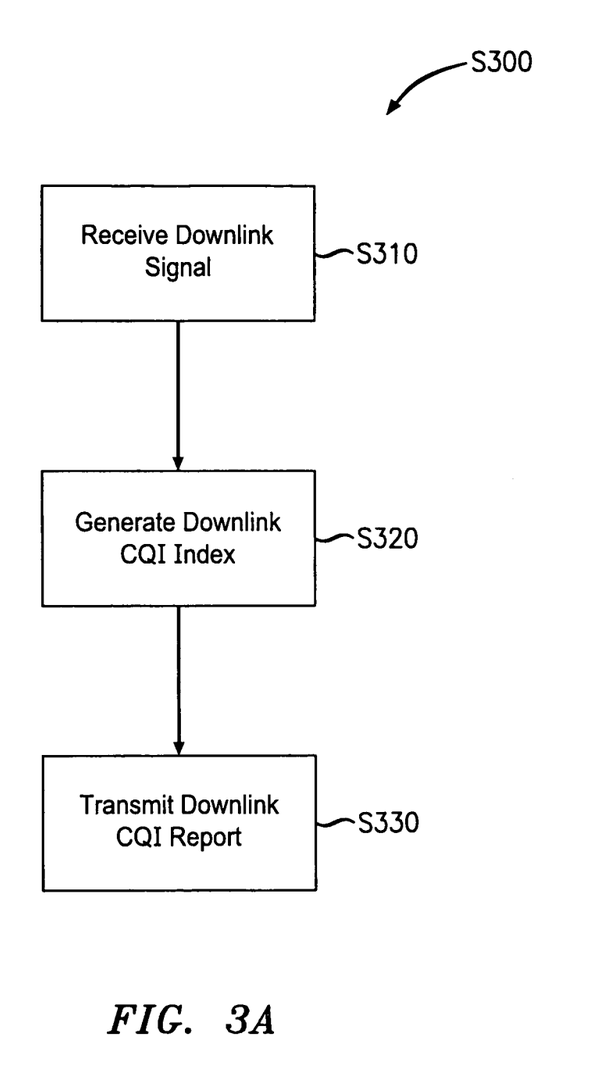
FIG. 3A illustrates a known method of generating a channel quality indication (CQI) index.

FIG. 3 illustrates a known method S300 of generating a downlink CQI index. At S310, the UE receives a downlink signal from a serving cell site. For example, the UE may receive a downlink pilot power from the current serving cell site. This determination may be made on the order of every 100 ms-200 ms, and the received pilot power will be averaged over this interval so as to average out the effects of fast fading.

According to "Evolved Universal Terrestrial Radio Access (E-UTRA); Physical layer procedures," $3^{rd}$ *Generation Partnership Program, 3GPP TS 36.212, V8.5.0*, December, 2008, the UE determines a CQI index based on the received downlink signal at S320. The UE chooses a CQI index so that the UE is able to communicate with the serving cell site within an error rate specified in "Evolved Universal Terrestrial Radio Access (E-UTRA); Physical layer procedures," $3^{rd}$ *Generation Partnership Program, 3GPP TS 36.212, V8.5.0*, December, 2008. More specifically, a CQI index may be determined by the UE based on at least one of a downlink SINR determined by the UE, channel conditions, and a modulation and coding scheme associated with the CQI index. The UE chooses the CQI index that allows the UE to communicate with the serving cell site using the modulation and coding scheme associated with the CQI index.

CQI is a number index from zero to fifteen. The UE determines the CQI index by determining the downlink SINR of the received downlink signal. The method by which the downlink SINR and the CQI index are determined can be any known method. Once the downlink SINR is determined, the UE maps the downlink SINR and other factors affecting decoding error rate performance to a CQI index. A CQI index of one represents the lowest SINR and a CQI index of fifteen represents the highest downlink SINR. Each CQI index identifies a modulation and coding rate scheme for the downlink.

At S330, the UE transmits the downlink CQI index to the serving cell site. The UE may transmit the CQI index over the air and every 1 millisecond.

Figure 3B:
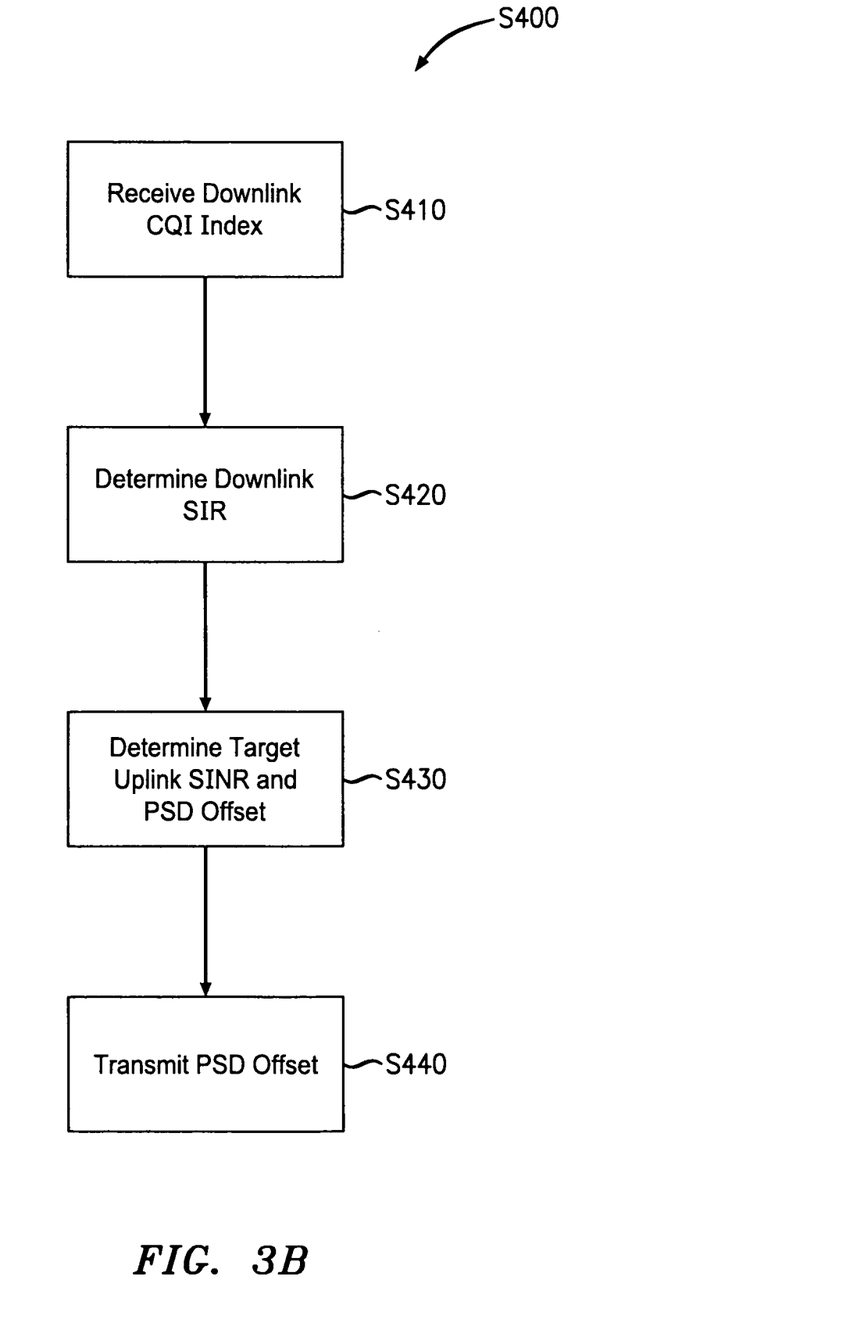
FIG. 3B illustrates a method of determining an uplink target signal-to-interference-and-noise-ratio (SINR) according to an example embodiment.

FIG. 3B illustrates a method S400 of determining an uplink target SINR according to an example embodiment.

At S410, the serving cell site receives the downlink CQI index transmitted from the UE. At S420, the serving cell site uses the CQI index to determine the downlink SINR. More specifically, because the LTE standard is programmed in the serving cell site, the serving cell site may use the CQI index to determine the downlink SINR. For example, the serving cell site may use a look-up table that includes CQI indexes associated with downlink SINR values, respectively. The look-up table may be determined by laboratory analysis and/or detailed simulation of the downlink SINR of each modulation and coding scheme associated with each CQI index. After the serving cell site determines the downlink SINR, the serving cell site may use the downlink SIR and the downlink SINR interchangeably. Because cost sensitivity of the downlink power at the serving cell site is generally less than for the UE for the uplink, the downlink is generally interference limited at the point that the uplink is out of coverage. Therefore, the downlink SIR and the downlink SINR may be used interchangeably.

At S430, the serving cell site determines the uplink target SINR using equation (6), (7) or (10), depending on whether full downlink SIR or fractional downlink SIR is used. For example, equation (6) or (7) is used for full downlink SIR and equation (10) is used for fractional downlink SIR.

Once the serving cell site determines the uplink target SINR, the serving cell site may determine the MCS level for the uplink based on the uplink target SINR and transmitted PSD offset. The serving cell site may observe short term variations in received SINR at the serving cell site and adjust the MCS level to track how the received SINR is changing.

The serving cell site aggregates the uplink target SINR with an average long term total interference plus noise to determine a PSD offset. The serving cell site then transmits the PSD offset to the UE at S440 as a signaling message. The UE may measure the average path loss from the downlink and, from the PSD offset, determine a transmit PSD. To reduce communication overload, the serving cell site may transmit the PSD offset periodically or when there is a high change in the PSD offset.

Figure 4:
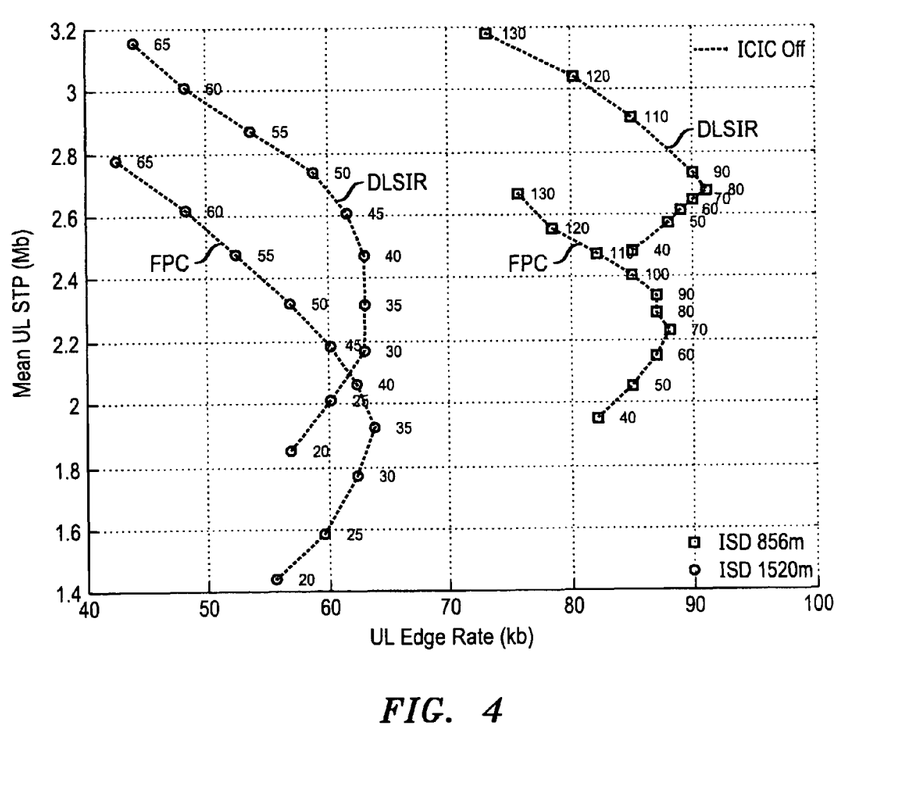
FIG. 4 illustrates a performance of a fractional downlink SIR control scheme.

FIG. 4 illustrates an 5 MHz LTE uplink STP versus edge rate under IoT control for FPC based uplink target SINR and fractional downlink SIR based approximation of the uplink target SINR using example embodiments. In FIG. 4, the fractional downlink SIR has $\beta=0.5$ while the FPC operation has $\alpha=0.8$. Each point is labeled with an IoT target in tenths of dB. As shown in FIG. 4, using the fractional downlink SIR to determine the uplink target SINR generates better STP versus edge rate characteristics than FPC.

Use of the downlink SIR as a metric results in a gain of about 30% higher capacity on uplink over FPC in sectorized cells. Moreover, the downlink SIR takes into account the UEs that are on sector boundaries.

As described above, using the downlink SIR as a metric for the uplink target SINR does not demand extra processing from a UE and does not add any overhead to inter-cell communication or air interface of the on-cell communication because the downlink SIR is determined from the CQI index.

Example embodiments being thus described, it will be obvious that the same may be varied in many ways. Such variations are not to be regarded as a departure from the spirit and scope of example embodiments, and all such modifications as would be obvious to' one skilled in the art are intended to be included within the scope of the claims.

What is claimed is:

1. A method of uplink power control, the method comprising:
   determining an uplink target signal-to-interference-and-noise ratio (SINR) for a user equipment (UE) based on a downlink signal-to-interference ratio (SIR), the downlink SIR being determined based on a channel quality indication (CQI) index received from the user equipment.

2. The method of claim 1, further comprising:
   determining a power spectral density offset based on the determined uplink target SINR.

3. The method of claim 2, further comprising:
   transmitting the power spectral density offset to the UE.

4. The method of claim 3, further comprising:
   determining a modulation and coding scheme based on the transmitting.

5. The method of claim 3, wherein the transmitting includes,
   transmitting the power spectral density offset periodically.

6. The method of claim 1, wherein the determining the uplink target SINR determines the uplink target SINR as follows:

Uplink_Target_SINR=$R_{\phi_I}$ where $\phi_I$ is the downlink SIR and R is a constant.

7. The method of claim 6, wherein the determining includes determining the downlink SIR as follows:

$$\varphi_I = \frac{g_{s,m}}{\sum_i g_{i,m} - g_{s,m}}$$

where $g_{i,m}$ is a path gain from the UE to a neighboring cell site i and $g_{s,m}$ is a path gain from the UE to a serving cell site s.

8. The method of claim 1, wherein the determining includes determining a modulation and coding scheme based on the downlink SIR.

9. The method of claim 1, wherein the determining the uplink target SINR includes,
   determining a downlink SINR based on the CQI index.

10. The method of claim 9, wherein the determining the uplink target SINR includes,
    determining the downlink SIR based on the downlink SINR.

11. The method of claim 1, wherein the determining the uplink target SINR determines the uplink target SINR in dB as follows:

$\Gamma=\Gamma_1+(1-\beta)(\Gamma_D+\Gamma_0)$ where $\Gamma_D$ is the downlink SIR, $\Gamma_0$ is a constant for calibration and $\Gamma_1$ is the target SINR for $\beta=1$ and $\beta$ is a constant.

12. A system comprising:
    a cell site configured to determine an uplink target signal-to-interference-and-noise ratio (SINR) for a user equipment (UE) based on a downlink signal-to-interference ratio (SIR), the downlink SIR being determined based on a channel quality indication (CQI) index received from the user equipment.

13. The system of claim 12, wherein the cell site is configured to determine a power spectral density offset based on the determined uplink target SINR.

14. The system of claim 13, wherein the cell site is configured to transmit the power spectral density offset to the UE.

15. The system of claim 13, wherein the cell site is configured to determine a modulation and coding scheme based on the power spectral density offset.

16. The system of claim 15, wherein the cell site is configured to transmit the power spectral density offset periodically.

17. The system of claim 12, wherein the cell site is configured to determine the uplink target SINR as follows:

Uplink_Target_SINR=$R_{\phi_I}$ where $\phi_I$ is the downlink SIR and R is a constant.

18. The system of claim 12, wherein the cell site is configured to determine the uplink target SINR in dB as follows:

$\Gamma=\Gamma_1+(1-\beta)(\Gamma_D+\Gamma_0)$ where $\Gamma_D$ is the downlink SIR, $\Gamma_0$ is a constant for calibration and $\Gamma_1$ is the target SINR for $\beta=1$ and $\beta$ is a constant.

* * * * *